(12) United States Patent
Norman et al.

(10) Patent No.: US 7,458,637 B2
(45) Date of Patent: Dec. 2, 2008

(54) BACK CONSTRUCTION WITH FLEXIBLE LUMBAR

(75) Inventors: Christopher J. Norman, Byron Center, MI (US); Kurt R. Heidmann, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 541 days.

(21) Appl. No.: 10/865,082

(22) Filed: Jun. 10, 2004

(65) Prior Publication Data

US 2005/0275263 A1    Dec. 15, 2005

(51) Int. Cl.
*A47C 3/00*    (2006.01)
(52) U.S. Cl. .................................................. 297/284.4
(58) Field of Classification Search ............. 297/284.4, 297/284.1, 284.8, 354.12, DIG. 4, 440.14, 297/440.22, 252
See application file for complete search history.

(56) References Cited

U.S. PATENT DOCUMENTS

| | | | |
|---|---|---|---|
| 293,833 A | 2/1884 | Winchester | |
| 362,796 A | 5/1887 | Tait | |
| 1,182,854 A * | 5/1916 | Poler | 297/284.4 |
| 1,590,240 A | 6/1926 | Gorton | |
| 2,087,254 A | 7/1937 | Herold | |
| 2,139,028 A | 12/1938 | Mensendicck et al. | |
| 2,471,024 A | 5/1949 | Cramer | |
| 2,492,107 A | 12/1949 | Orton et al. | |
| 2,627,898 A | 2/1953 | Jackson | |
| 2,712,346 A | 7/1955 | Sprinkle | |
| 2,818,911 A | 1/1958 | Syak | |
| 2,843,195 A * | 7/1958 | Barvaeus | 297/284.4 |
| 2,894,565 A | 7/1959 | Conner | |
| 3,106,423 A | 10/1963 | Schwarz | |
| 3,369,840 A | 2/1968 | Dufton | |
| 3,540,777 A | 11/1970 | de Beaumont | |
| 3,565,482 A | 2/1971 | Blodee | |
| 3,762,769 A * | 10/1973 | Poschl | 297/284.4 |
| 3,813,148 A | 5/1974 | Kraus | |
| 3,877,750 A | 4/1975 | Scholpp | |
| 3,926,286 A | 12/1975 | Johnson | |
| 3,934,932 A | 1/1976 | Ekornes | |

(Continued)

FOREIGN PATENT DOCUMENTS

DE         1044354         11/1958

(Continued)

*Primary Examiner*—Milton Nelson, Jr.
(74) *Attorney, Agent, or Firm*—Price, Heneveld, Cooper, DeWitt & Litton LLP

(57) ABSTRACT

A back construction includes a back shell mounted on a back frame at top and bottom connections, and a flexible lumbar section biased forwardly by a biasing device. The bottom connection is located rearward of the back shell to allow unencumbered sliding entry into the seating unit from a lateral side position, but the bottom connection defines a virtual pivot forward of its physical location to provide the desired path of flexure when the lumbar section is flexed. In one form, the bottom connection is a pair of non-parallel links of dissimilar length. In another form, the bottom connection is a follower with two bearings following a guide slot. In some variations, the force of the biasing device is variable. Seating units incorporating the back construction include a vehicle seat, a foldable portable stadium seat, and a wheelchair seat.

56 Claims, 9 Drawing Sheets

U.S. PATENT DOCUMENTS

| | | |
|---|---|---|
| 3,938,858 A | 2/1976 | Drabert et al. |
| 3,948,558 A | 4/1976 | Obermeier et al. |
| 3,948,560 A * | 4/1976 | Obermeier et al. ..... 297/354.12 |
| 3,982,785 A | 9/1976 | Ambasz |
| 3,989,297 A | 11/1976 | Kerstholt |
| 4,007,962 A | 2/1977 | Muller-Deisig |
| 4,054,318 A | 10/1977 | Costin |
| 4,083,209 A | 4/1978 | Sloan, Jr. |
| 4,084,850 A | 4/1978 | Ambasz |
| 4,099,775 A | 7/1978 | Mizelle |
| 4,153,293 A * | 5/1979 | Sheldon ................. 297/284.4 |
| 4,157,203 A | 6/1979 | Ambasz |
| 4,181,357 A | 1/1980 | Swenson et al. |
| 4,226,473 A | 10/1980 | Johnson |
| 4,309,206 A | 1/1982 | Michaud et al. |
| 4,313,637 A * | 2/1982 | Barley .................... 297/284.4 |
| 4,314,728 A | 2/1982 | Faiks |
| 4,316,632 A | 2/1982 | Brauning |
| 4,333,683 A | 6/1982 | Ambasz |
| 4,380,352 A | 4/1983 | Diffrient |
| 4,390,206 A | 6/1983 | Faiks et al. |
| 4,449,752 A | 5/1984 | Yasumatsu et al. |
| 4,452,486 A | 6/1984 | Zapf et al. |
| 4,465,317 A | 8/1984 | Schwarz |
| 4,502,728 A | 3/1985 | Sheldon et al. |
| 4,521,053 A | 6/1985 | de Boer |
| 4,544,204 A | 10/1985 | Schmale |
| 4,585,272 A | 4/1986 | Ballarini |
| 4,595,237 A | 6/1986 | Nelsen |
| 4,621,864 A | 11/1986 | Hill |
| 4,621,866 A | 11/1986 | Zani |
| 4,632,454 A | 12/1986 | Naert |
| 4,638,679 A | 1/1987 | Tannenlaufer |
| 4,641,884 A | 2/1987 | Miyashita et al. |
| 4,685,730 A | 8/1987 | Linguanotto |
| 4,703,974 A | 11/1987 | Brauning |
| 4,709,963 A | 12/1987 | Uecker et al. |
| 4,720,142 A | 1/1988 | Holdredge et al. |
| 4,730,871 A | 3/1988 | Sheldon |
| 4,763,950 A | 8/1988 | Tobler |
| 4,776,633 A | 10/1988 | Knoblock et al. |
| 4,779,925 A | 10/1988 | Heinzel |
| 4,834,453 A | 5/1989 | Makiol |
| 4,834,454 A | 5/1989 | Dicks |
| 4,842,333 A | 6/1989 | Meiller |
| 4,848,837 A | 7/1989 | Volkle |
| 4,854,641 A | 8/1989 | Reineman et al. |
| 4,861,108 A | 8/1989 | Acton et al. |
| 4,878,710 A | 11/1989 | Tacker |
| 4,880,271 A | 11/1989 | Graves |
| 4,889,384 A | 12/1989 | Sulzer |
| 4,896,918 A | 1/1990 | Hoshihara |
| 4,906,045 A | 3/1990 | Hofman |
| 4,913,303 A | 4/1990 | Harris |
| 4,915,449 A | 4/1990 | Piretti |
| 4,948,198 A | 8/1990 | Crossman |
| 4,951,995 A | 8/1990 | Teppo et al. |
| 4,966,413 A | 10/1990 | Palarski |
| 4,968,093 A | 11/1990 | Dal Monte |
| 4,981,326 A | 1/1991 | Heidmann |
| 4,984,846 A | 1/1991 | Ekornes |
| 5,009,466 A | 4/1991 | Perry |
| 5,027,022 A | 6/1991 | Tanaka et al. |
| 5,029,940 A | 7/1991 | Golynsky et al. |
| 5,037,116 A | 8/1991 | Desanta |
| 5,039,163 A | 8/1991 | Tolleson |
| 5,044,693 A | 9/1991 | Yokota |
| 5,050,930 A | 9/1991 | Schuster et al. |
| 5,056,862 A | 10/1991 | May et al. |
| 5,062,676 A | 11/1991 | Mars |
| 5,087,098 A | 2/1992 | Ishizuka |
| 5,088,790 A * | 2/1992 | Wainwright et al. ..... 297/284.4 |
| 5,100,200 A | 3/1992 | Keusch et al. |
| 5,100,201 A | 3/1992 | Becker, III et al. |
| 5,102,196 A | 4/1992 | Kaneda et al. |
| 5,106,157 A | 4/1992 | Nagelkirk et al. |
| 5,107,720 A | 4/1992 | Hatfield |
| 5,110,003 A | 5/1992 | MacWilliams |
| 5,112,108 A | 5/1992 | Zapf |
| 5,120,109 A | 6/1992 | Rangoni |
| 5,192,114 A | 3/1993 | Hollington et al. |
| 5,193,880 A | 3/1993 | Keusch et al. |
| 5,217,278 A | 6/1993 | Harrison et al. |
| 5,240,308 A | 8/1993 | Goldstein et al. |
| 5,249,839 A | 10/1993 | Faiks et al. |
| 5,277,475 A | 1/1994 | Brandes |
| 5,282,670 A | 2/1994 | Karsten et al. |
| 5,299,851 A | 4/1994 | Lin |
| 5,302,002 A | 4/1994 | Nagasaka |
| 5,308,145 A | 5/1994 | Koepke et al. |
| 5,318,346 A | 6/1994 | Roossien et al. |
| 5,320,410 A | 6/1994 | Faiks et al. |
| 5,328,242 A | 7/1994 | Steffens et al. |
| 5,354,120 A | 10/1994 | Volkle |
| 5,364,162 A | 11/1994 | Bar et al. |
| 5,366,274 A | 11/1994 | Roericht et al. |
| 5,385,388 A | 1/1995 | Faiks et al. |
| 5,405,188 A | 4/1995 | Hanson |
| 5,423,593 A * | 6/1995 | Nagashima ............. 297/284.4 |
| 5,447,356 A | 9/1995 | Snijders |
| 5,449,086 A | 9/1995 | Harris |
| 5,452,868 A | 9/1995 | Kanigowski |
| 5,460,427 A | 10/1995 | Serber |
| 5,472,261 A | 12/1995 | Oplenskdal et al. |
| 5,474,360 A | 12/1995 | Chang |
| 5,487,591 A | 1/1996 | Knoblock |
| 5,505,520 A | 4/1996 | Frusti et al. |
| 5,518,294 A | 5/1996 | Ligon, Sr. et al. |
| 5,529,201 A | 6/1996 | Tallent et al. |
| 5,540,481 A | 7/1996 | Roossien et al. |
| 5,564,783 A | 10/1996 | Elzenbeck et al. |
| 5,573,302 A | 11/1996 | Harrison et al. |
| 5,577,807 A | 11/1996 | Hodge et al. |
| 5,582,459 A | 12/1996 | Hama et al. |
| 5,590,932 A | 1/1997 | Olivieri |
| 5,597,203 A | 1/1997 | Hubbard |
| 5,611,598 A | 3/1997 | Knoblock |
| 5,630,647 A | 5/1997 | Heidmann et al. |
| 5,636,898 A | 6/1997 | Dixon et al. |
| 5,651,584 A | 7/1997 | Chenot et al. |
| 5,660,439 A | 8/1997 | Unwalla |
| 5,782,536 A | 7/1998 | Heidmann |
| 5,791,733 A | 8/1998 | Van Hekken |
| 5,842,743 A * | 12/1998 | Wright et al. ............ 297/378.1 |
| 5,860,701 A | 1/1999 | Jungjohann et al. |
| 5,868,467 A | 2/1999 | Moll |
| 5,871,258 A | 2/1999 | Battey |
| 5,915,788 A | 6/1999 | Schneider |
| 5,947,558 A * | 9/1999 | Suzuki et al. ............ 297/284.4 |
| 5,975,634 A | 11/1999 | Knoblock et al. |
| 6,003,943 A | 12/1999 | Schneider |
| 6,035,901 A | 3/2000 | Stumpf |
| 6,135,559 A | 10/2000 | Kowalski |
| 6,250,715 B1 | 6/2001 | Caruso |
| 6,367,876 B2 | 4/2002 | Caruso |
| 6,412,869 B1 | 7/2002 | Pearce |
| 6,474,737 B1 | 11/2002 | Canteleux et al. |
| 6,523,898 B1 | 2/2003 | Ball et al. |
| 6,536,841 B1 | 3/2003 | Pearce et al. |
| 6,609,755 B2 | 8/2003 | Koepke et al. |
| 6,616,228 B2 * | 9/2003 | Heidmann ............... 297/284.4 |
| 6,669,292 B2 | 12/2003 | Koepke et al. |
| 6,679,553 B2 | 1/2004 | Battey et al. |
| 6,709,058 B1 | 3/2004 | Diffrient |

| | | |
|---|---|---|
| 2002/0003366 A1 | 1/2002 | Fourrey et al. |
| 2002/0047297 A1 | 4/2002 | Longhi et al. |
| 2002/0130540 A1 | 9/2002 | Rajasingham |
| 2002/0163233 A1 | 11/2002 | Craft et al. |
| 2002/0180248 A1 | 12/2002 | Kinoshita et al. |
| 2003/0071500 A1 | 4/2003 | Dinkel et al. |
| 2003/0094841 A1 | 5/2003 | McMillen et al. |
| 2003/0137171 A1 | 7/2003 | Deimen et al. |
| 2003/0189367 A1 | 10/2003 | Erker |
| 2003/0214166 A1 | 11/2003 | Schambre et al. |

FOREIGN PATENT DOCUMENTS

| | | |
|---|---|---|
| DE | 948544 | 9/1962 |
| DE | 9109959 | 10/1991 |
| EP | 0043242 | 1/1982 |
| EP | 516341 A1 | 12/1992 |
| EP | 680713 A1 | 8/1995 |
| FR | 708283 | 7/1931 |
| GB | 761805 | 11/1956 |
| GB | 794138 | 6/1958 |
| GB | 1278501 | 6/1972 |
| JP | 47-14408 | 10/1972 |
| JP | 5-184432 | 7/1991 |
| JP | 05207920 A * | 8/1993 |
| WO | WO 8700738 | 2/1987 |
| WO | WO 9325121 | 12/1993 |

* cited by examiner

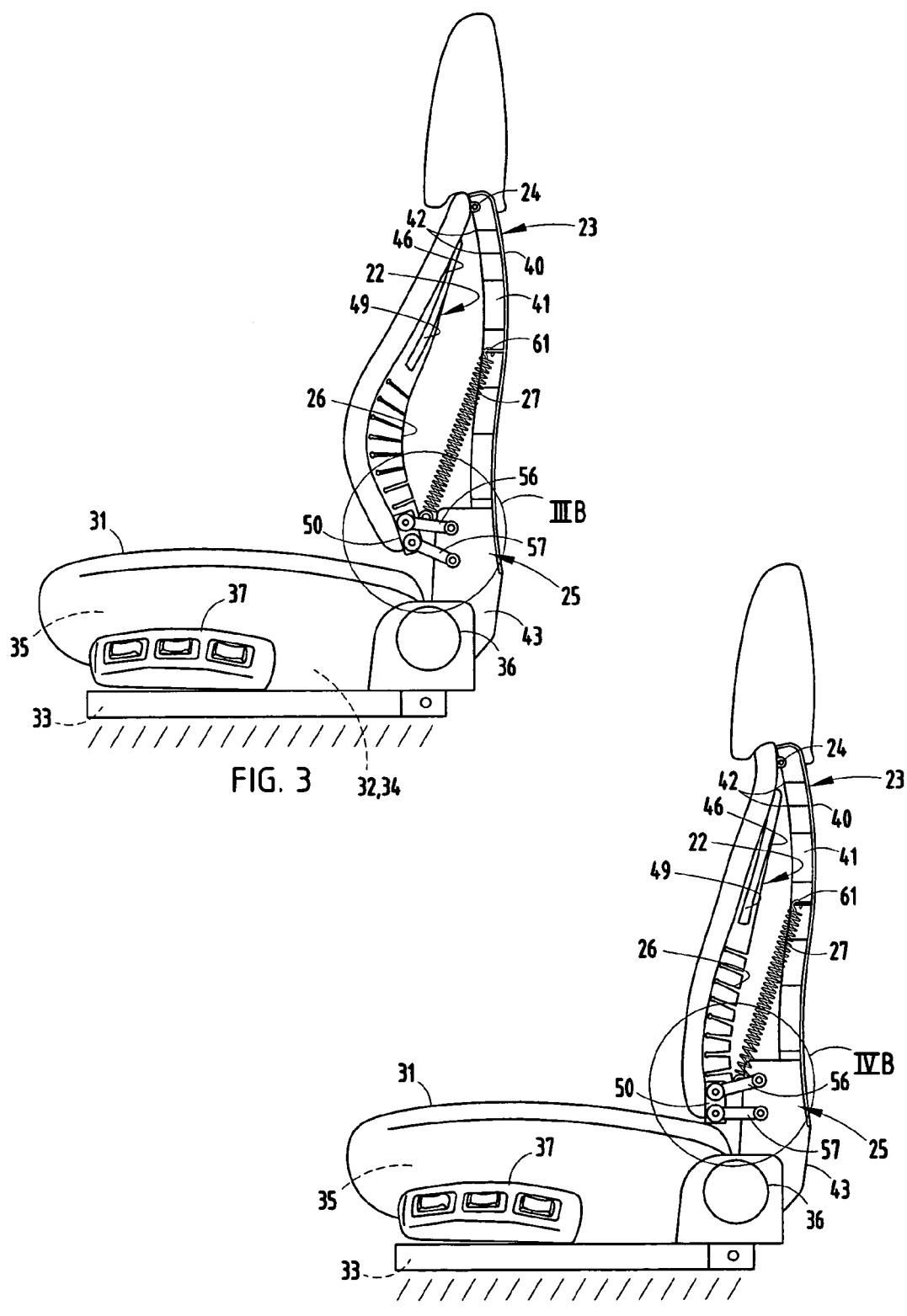

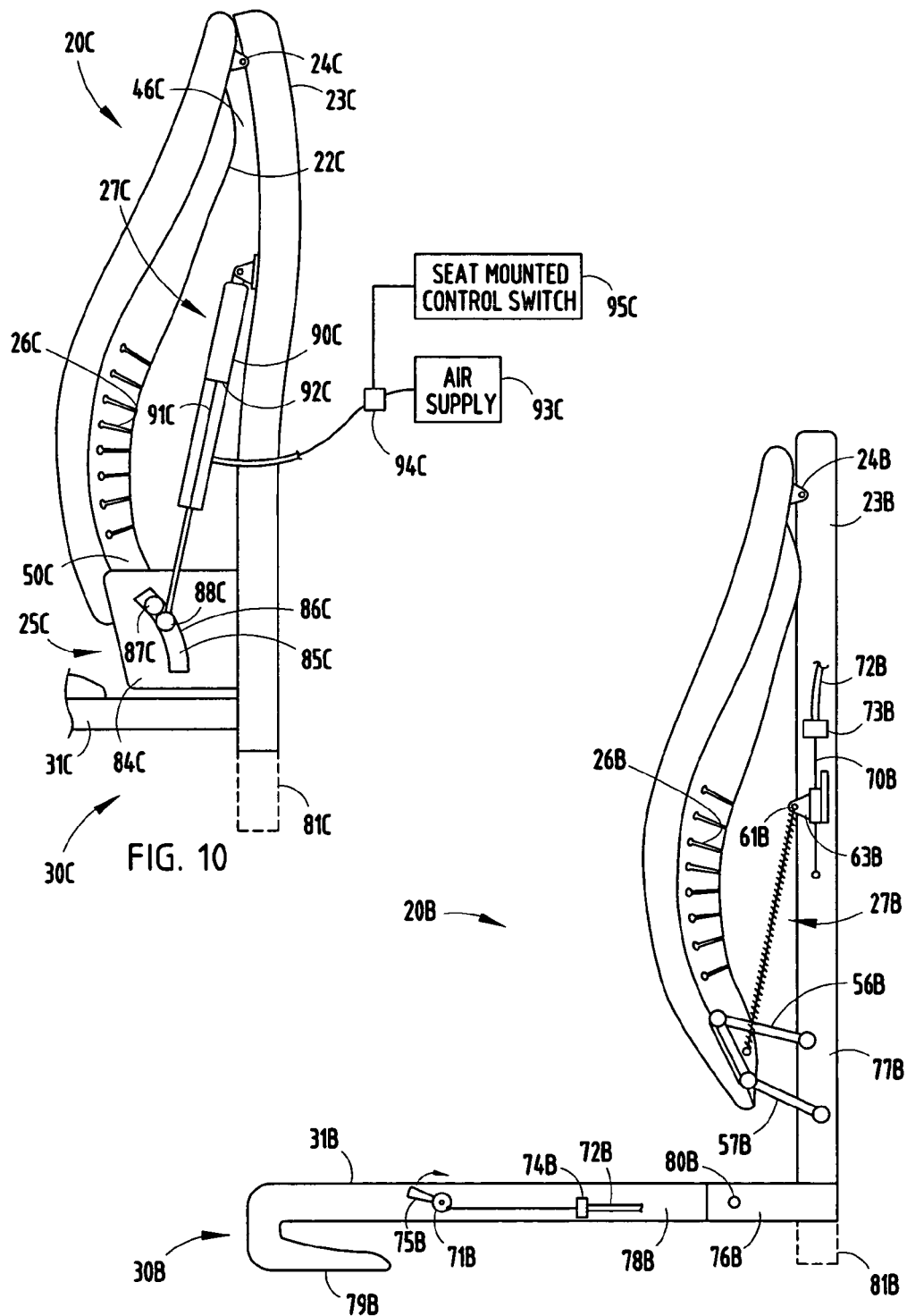

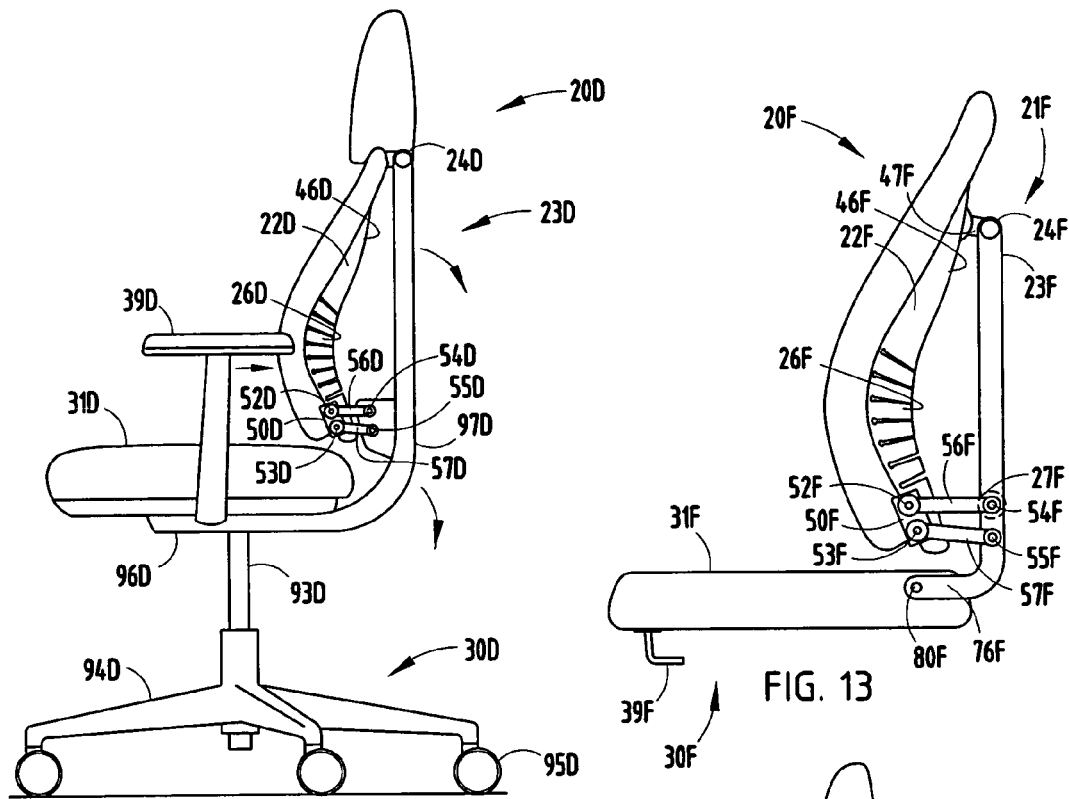
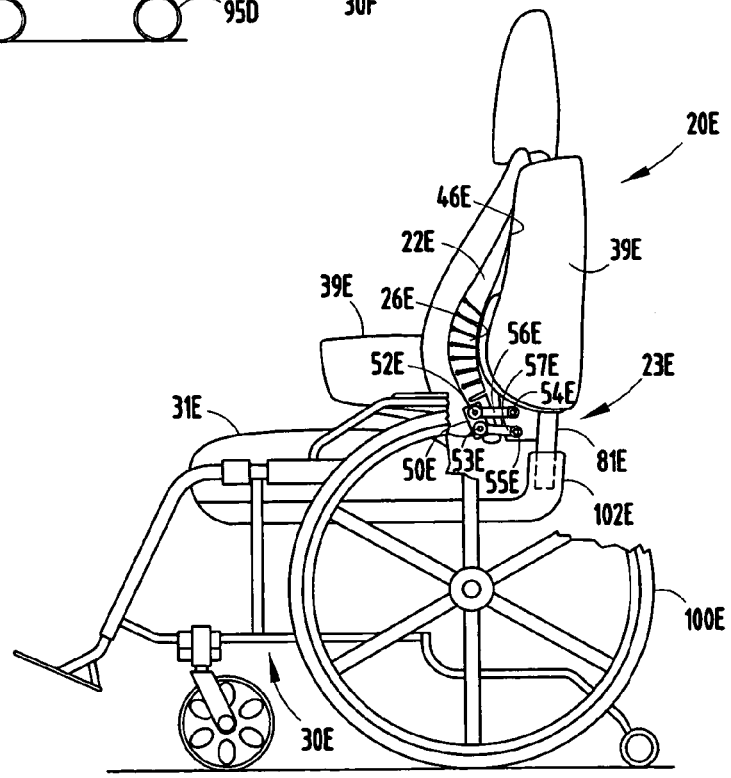
FIG. 11
FIG. 13
FIG. 12

BACK CONSTRUCTION WITH FLEXIBLE LUMBAR

BACKGROUND

The present invention relates to back constructions, such as may be used not only for chairs and furniture seating, but also in vehicle and vessel seating (personal and mass-transit, including automobiles, trucks, buses, planes, trains, boats, etc.), stadium and auditorium seating, bench and multi-person seating, and other seating arrangements.

A particularly comfortable and ergonomic back construction is disclosed in Battey et al. U.S. Pat. No. 5,871,258 (hereafter the "Battey '258 patent"). The back construction in the Battey '258 patent includes a back shell pivoted to a back frame at top pivots and at forwardly-located bottom pivots, and includes a flexible lumbar section that combines with stiff thoracic and pelvic sections to cause the back to flex along a well-defined predetermined path. A biasing mechanism biases the lumbar section forwardly for optimal support to a seated user. Notably, in Battey '258, the bottom pivots are located on flanges (134) that extend forward of a front surface of the back shell, in a position where they limit overall design options and potentially interfere with laterally sliding onto the seat from a side position. It is desirable in some environments and some seating applications to eliminate interference to lateral entry onto the seat caused by the forwardly-extending flanges. At the same time, it is desirable to maintain the ergonomic function and comfortableness of a flexible back shell construction similar to the one shown in the Battey '258 patent. Also, increased design flexibility is desired for both aesthetic and functional aspects, such as to allow relocation of the top and/or bottom pivots, while maintaining a relatively simple mechanical assembly and while using environmentally-safe parts that can be readily disassembled and recycled.

Thus, a system having the aforementioned advantages and solving the aforementioned problems is desired.

SUMMARY OF THE PRESENT INVENTION

In one aspect of the present invention, a back construction for a seating unit includes a back frame. A back support includes top and bottom connections operably supporting the back support on the back frame. The back support has a flexible lumbar region between the top and bottom connections, the bottom connections directing movement of a lower edge of the back support along a predetermined path as the lumbar region is flexed from a forwardly-protruding shape toward a more planar shape. The bottom connections are positioned rearward of and configured to not project in front of the lower edge of the back support.

In another aspect of the present invention, a seating unit includes a base, a seat, a back frame, and a back support including at least one top connection operably supporting the back support on the back frame and at least one bottom connection operably supporting the back support on one of the base and the back frame. The back support has a flexible lumbar region between the top and bottom connections, the bottom connection being constructed to direct movement of a lower edge of the back support generally downwardly along a predetermined path as the lumbar region is flexed from a forwardly-protruding shape toward a more planar shape, the bottom connection also being positioned rearward of front surfaces along sides of the lower edge.

In another aspect of the present invention, a back construction for a seating unit includes a back frame and a back support including top and bottom connections operably supporting the back support on the back frame. The back support has a flexible lumbar region between the top and bottom connections. One of the top and bottom connections constrain movement of the back support along a predetermined path as the lumbar region is flexed from a forwardly-protruding shape toward a more planar shape, the one connection being positioned rearward of and configured to not project in front of the back support.

In still another aspect of the present invention, a seating unit includes a seat and a back frame. A back support is operably connected to the back frame at an upper connection and a lower connection, the back support having a flexible lumbar region generally between the upper and lower connections. The lower connection includes a linkage arrangement having at least a pair of cooperating links adapted to constrain at least the lower portion of the back support to move along a predetermined path as the lumbar region is flexed.

In yet another aspect of the present invention, a seating unit includes a seat and a back frame. A back support is connected to the back frame at an upper connection and a lower connection, the back support having a flexible lumbar region generally between the upper and lower connections. The lower connection includes a constraining mechanism located rearward of the forward face of the back support and adapted to constrain at least the lower portion of the back support to move and rotate along a predetermined path as the lumbar region is flexed.

In another aspect of the present invention, a seating unit includes a seat, a back frame, a back support, and constraining means for connecting the back support to the back frame including an upper connection and a lower connection. The back support has a flexible lumbar region generally between the upper and lower connections. The constraining means is located rearward of a forward face of the back support and is adapted to constrain at least a lower portion of the back support to move and rotate along a predetermined path as the lumbar region is flexed.

These and other aspects, objects, and features of the present invention will be understood and appreciated by those skilled in the art upon studying the following specification, claims, and appended drawings.

BRIEF DESCRIPTION OF DRAWINGS

FIG. 9 is a side view of a second modified back construction of the present invention;

FIG. 10 is a side view of a third modified back construction of the present invention; and FIGS. 11-13 are side views of fourth through sixth modified seating units of the present invention, including an office chair, a wheelchair, and a foldable portable stadium seating unit.

DETAILED DESCRIPTION OF PREFERRED EMBODIMENTS

Figure 1:
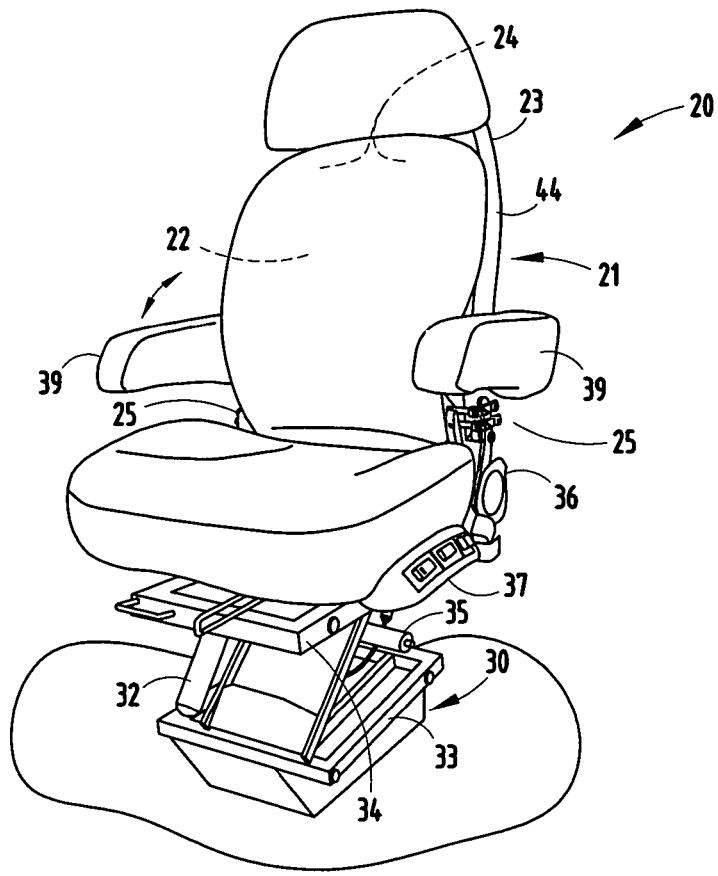
FIGS. 1-3 are perspective, front, and side views of a seating unit embodying the present invention.

The present disclosure focuses on a seating unit 20 (FIG. 1) having a back construction 21 that provides excellent lumbar support. The back construction 21 includes a back shell 22 (FIG. 3) (also called a "back support" herein) pivoted to a back frame 23 at top and bottom connections 24 and 25, and a flexible lumbar section 26 biased forwardly for optimal ergonomic back support by a biasing device 27. The illustrated bottom connection 25 is located rearward of a front surface along edges of the back shell 22 to allow unencumbered sliding side entry (i.e. side-open access) into the seating unit 20 from a lateral side position. The bottom connection 25 constrains movement of the pelvic section 50 to a particular path and particular angular presentation at points along the path. The top and bottom end points of the pelvic section 50 along the path roughly define a virtual pivot forward of its physical location on the back construction 21. This results in the desired path of flexure when the lumbar section 26 is flexed for optimal comfort and support. The ability to slide into the seating unit 20 is particularly advantageous in automotive, truck, and heavy equipment seating where there is a steering wheel to avoid. Also, the side-open access is advantageous in public seating where a person needs to or may want to slide in from a side of the seat. However, it is also potentially desirable in many furniture and more traditional seating designs, such as for aesthetic, design, and functional reasons, as described below.

The illustrated seating unit 20 (FIG. 1) includes a base 30 suitable for attachment to the floor pan of a vehicle body, such as a truck tractor or passenger vehicle. A seat 31 is adjustably supported on the base 30 such as by a height adjustment mechanism 32, a seat-and-back depth adjustment mechanism 33, a seat-only depth adjustment mechanism 34, a seat tilt adjustment mechanism 35 and a back tilt adjustment mechanism 36. The mechanisms 32-36 can be electrically (or pneumatically or hydraulically) powered, and controlled by control switches at a convenient location 37 such as adjacent a side of the seat 31. Several suitable adjustment mechanisms are known in the art of vehicle seat manufacture, and a detailed discussion of their construction is not required for an understanding of the present inventive concepts.

Figure 2:
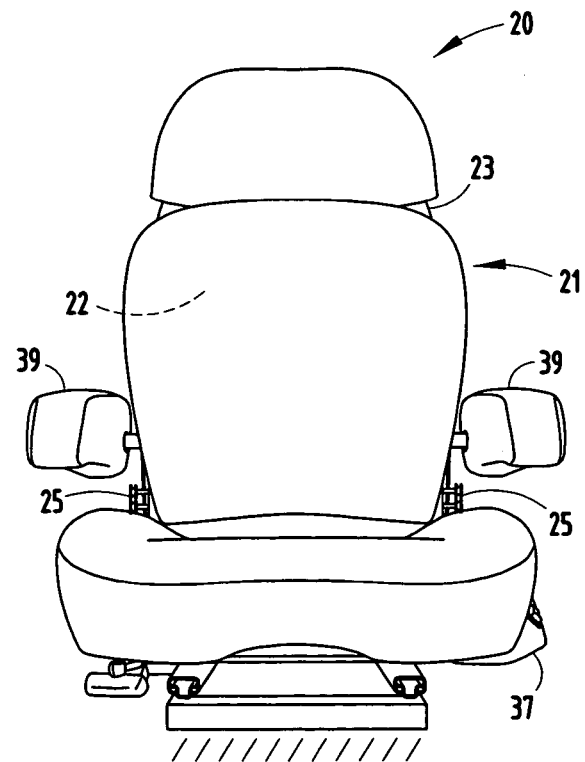
Figure 6:
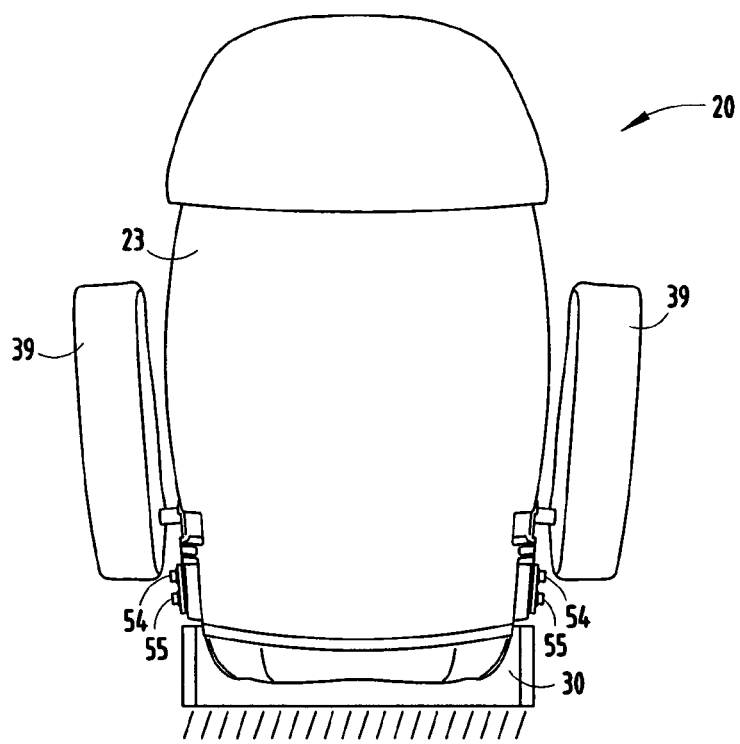
FIGS. 6-7 are rear and front views of the rigid back frame of FIG. 1.
Figure 7:
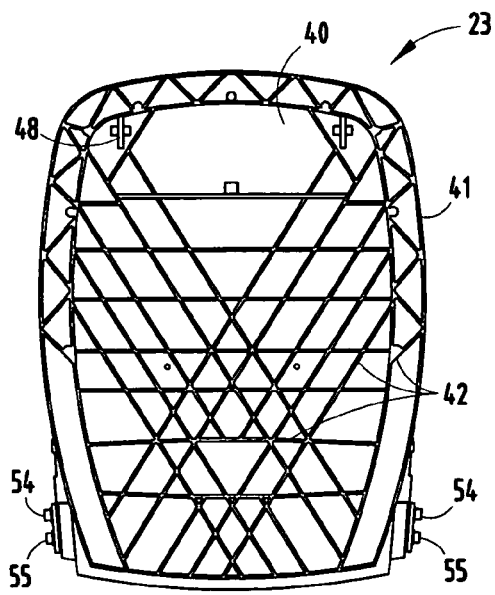

The illustrated back frame 23 (FIG. 3) includes a large metal vertical rear panel 40, an integral perimeter flange 41 extending around the panel 40, and reinforcement ribs 42 extending from the perimeter flange 41 crisscrossingly inwardly for stiffening the back frame 23 (see FIG. 7). Legs 43 (FIG. 3) are secured to the back frame 23 and extend downwardly from the back frame 23 where they are attached to the back tilt adjustment mechanism 36, which is in turn fixed to the base 30. The side portions of the perimeter flange 41 are extended forwardly to form side panels 44 (FIG. 1) that cover the laterally-open gaps between the back frame 23 and the back shell 22. (The closest side panel 44 and armrests 39 are removed in FIGS. 3-4 so that the inner workings of the top and bottom connections 24 and 25 can be more easily seen.) Armrests 39 are pivotally attached to sides of the back frame 23, for pivotal movement between a lowered use position (FIGS. 1-2) and a raised storage position (FIG. 6). In the raised storage position, the armrests 39 are positioned adjacent a side of the back frame 23 and back shell 22 in locations where they do not interfere with lateral sliding entry into the seat 31 and back 21. The illustrated base 30 includes apertured attachment flanges configured for attachment to a vehicle body. Further, the base 30, the seat 31, and the back frame 23 have suitable strength and construction for passing Federal Motor Vehicle Safety Standards (FMVSS), including impact and crashworthiness test requirements. The FMVSS standards are very well known standards in the art of manufacturing vehicles, and are publicly available, such that a complete description of these standards is not necessary for an understanding of the present invention. It is well known that all modern passenger vehicles undergo crash testing as part of their approval process.

It is noted that the present back construction can be used in combination with a variety of different back frames, seats, and bases. Several different back frames and bases are illustrated herein. However, it is contemplated that the back frame could be other configurations not specifically illustrated herein, such as a perimeter frame, or a spine frame. Also, different bases and seats can be used. Accordingly, it is to be understood that the present inventive concepts are not intended to be limited to only those illustrated arrangements.

Figure 8:
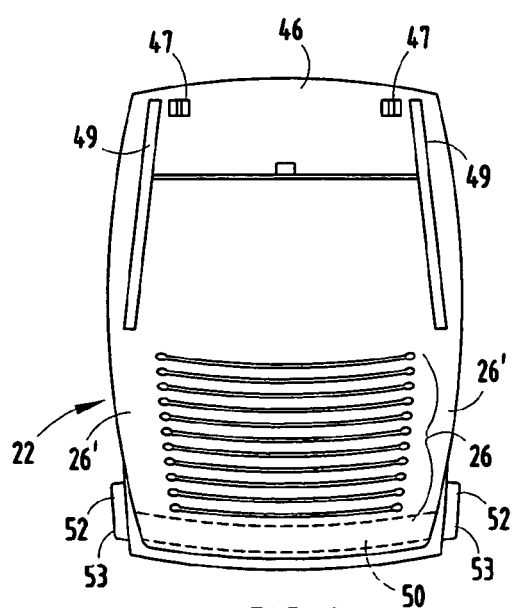
FIG. 8 is a rear view of the flexible back shell of FIG. 1.

The back shell 22 (FIG. 8) is made from a sheet of "solid" plastic material, and includes a plurality of parallel horizontal slits along its lumbar region 26, causing the lumbar region 26 to be flexible. The back shell 22 includes a stiff thoracic section 46 with two horizontally-spaced top pivots 47 defined along its upper edge. The top pivots 47 pivotally engage mating pivots 48 near a top of the back frame 23 to form the top connections 24. The stiff thoracic section 46 can be reinforced by braces 49 (FIG. 8) if necessary for stability, with the braces being integral or add-on components to the back shell 22. The back shell 22 (FIG. 3) further includes a stiff pelvic section 50 with a stiffener bracket 51 along its lower edge. A pair of leaf-spring-like edge strips 26' extend vertically across the lumbar section 26 and connect the thoracic and pelvic sections 46 and 50, and a plurality of flexible horizontal strips extend between the edge strips 26' in the lumbar section 26.

A pair of pivots 52 and 53 are defined on each end of the stiffener bracket 51 on each side of the back shell 22. The pivots 52 and 53 are preferably located at or slightly rearward of the front surface of edges of the back shell 22. A cushion may be used (but does not need to be used) on the back construction 20. As illustrated, a cushion is positioned on the back shell 22 which causes the front surface of the back 20 to be located forward of the front surface of the back shell 22 itself. It is noted that horizontal cross sections taken through the thoracic section 46, lumbar section 26 and the pelvic section 50 of the back shell 22 are forwardly concave in shape, and that a vertical cross section is forwardly protruding in the lumbar section 26.

A pair of pivots 54 and 55 are defined on each side of the back frame 23 in locations rearward of the respective pivots 52 and 53. Each lower side of the back shell 22 is operably pivotally connected to the back frame 23 by a top link 56 on each side (with opposite ends pivoted at pivots 52 and 54) and by a bottom link 57 on each side (with opposite ends pivoted at pivots 53 and 55). The links 56 and 57 form a four-bar linkage arrangement that constrains movement of the lower edge of the pelvic region 50 to a particular path of movement (generally vertical). Also, the links 56 and 57 operate to cause the pelvic region 50 to have a particular angular orientation at each point along the path of movement. As illustrated in the FIG. 3A, the top link 56 is a same length as the bottom link 57. However, the distance between the pivots 54 and 55 on the base frame 23 is slightly greater than the distance between the pivots 52 and 53 on the back shell 22. The result is a four-bar linkage arrangement that is not a parallelogram, because of the non-uniform spacing of the pivots. This results in a linkage arrangement designed to cause a specific angular change of a lower edge of the back shell 22 (and a specific path of movement) in the pelvic section 50 during flexure of the lumbar section 26. It is noted that a length of the links (56 and 57) can also be made unequal if design aspects cause this to be desirable, as discussed below.

Figures 3A, 4A:
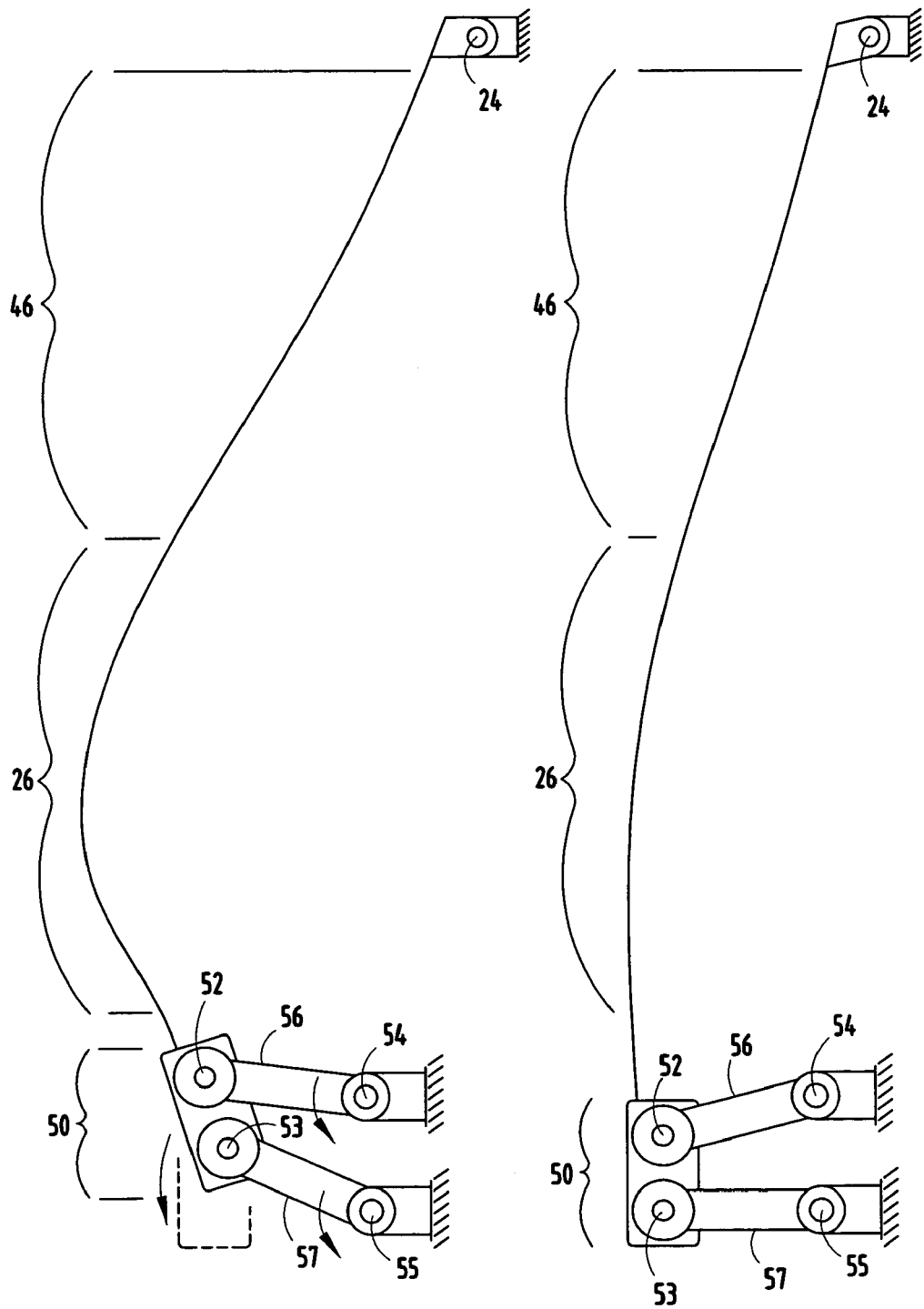
FIG. 3A being a schematic view of FIG. 3 and FIG. 3B being an enlargement of the four-bar linkage in the circled area IIIB.
FIG. 4A being a schematic view of FIG. 4, and FIG. 4B being an enlargement of the circled area IVB.
Figure 3B:
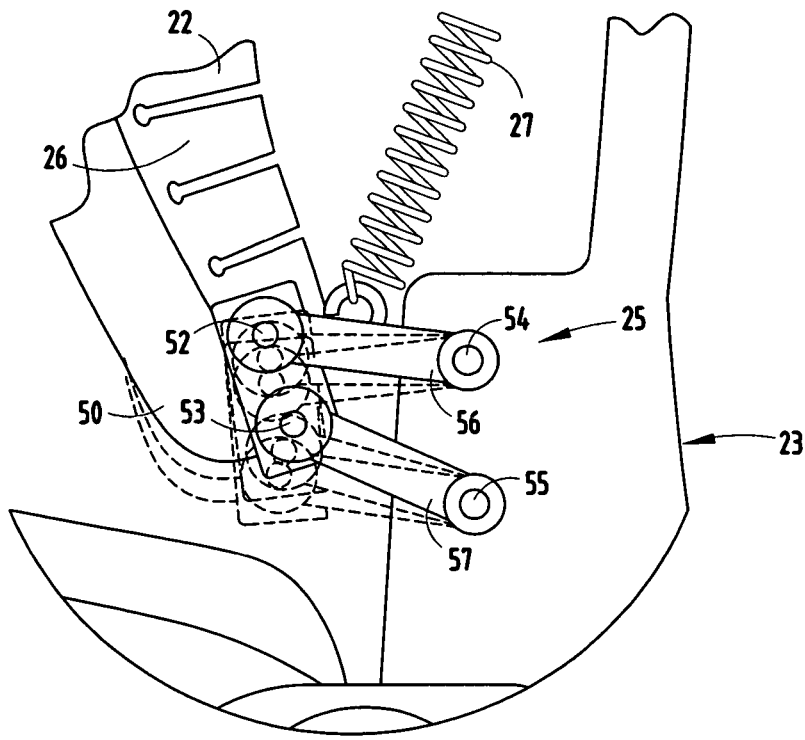
FIG. 3C is a side schematic view showing a design process for selecting pivot point locations and lengths of the four-bar linkage arrangement shown in FIGS. 3-3B, 4-4B.
FIG. 3D is a similar schematic view showing the result of a poorly selected set of pivot point locations and link lengths.
Figure 3C:
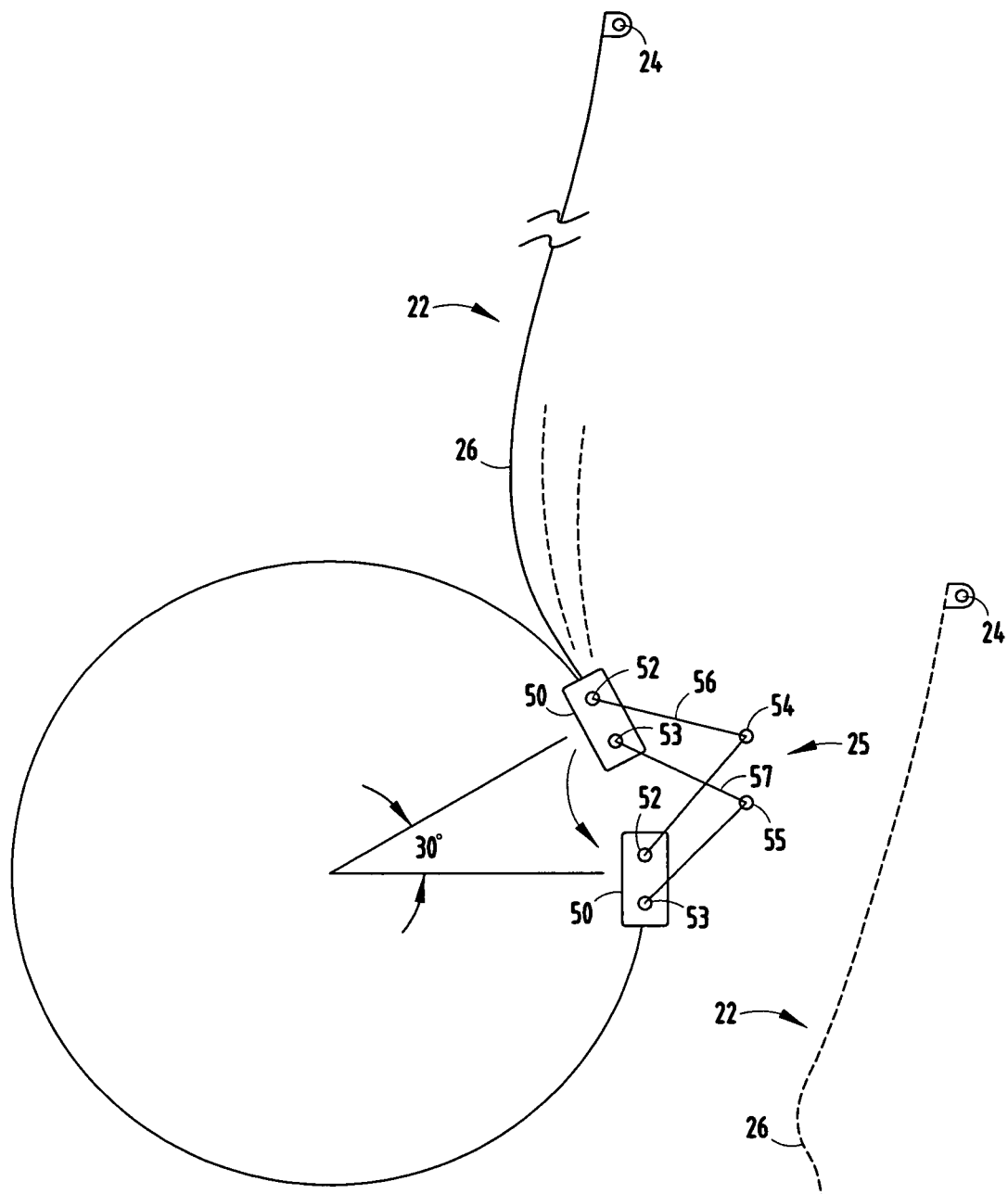
Figure 3D:
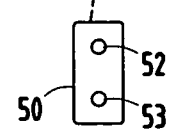

FIG. 3C further illustrates the top and bottom end points of movement of the bottom section of the back shell 22. Notably, by determining the desired top and bottom locations and orientations of the pelvic section 50 (illustrated by the large circle passing through pivot points 52-53), two positions for each of the pivots 52 and 53 are defined. By selecting a particular length of the links 56 and 57, a preferred location of the pivot points 54 and 55 can be established by using principles of mathematics and geometry. During selection of the points 52-55 and a length of the links 56 and 57, the following concept is important to understand. The links 56 and 57 "constrain" and control the path of movement and relative vertical angle of the lower pelvic section 50 during the entire path of movement. It is important that this angle not result in the lumbar section 26 being forced to take on an un-natural bend, such as the S-shaped bend illustrated in FIG. 3D. Specifically, if the angle of rotation for the pelvic section 50 is faster (or slower) than a matched lengthening of the distance to the top pivot 24, then the lumbar section 26 will be undesirably forced toward an unnatural and potentially uncomfortable double bend or uncontrolled shape (e.g. the shape shown in FIG. 3D). Thus, a position of the pivots 52-55 and length of links 56 and 57 must preferably be chosen to cooperate with each other to cause a closely controlled, constrained and predictable path of movement and angular rotation during movement and flexure of the back shell 22. In such a circumstance, the back shell 22 will preferably maintain a continuous and natural curvature as illustrated by the dashed lines representing the lumbar section 26 in FIG. 3C. The lumbar section 26 will avoid a shape that is kinked or "double bent". In the illustration of FIG. 3C, the links 56 and 57 are each about 2 inches long, the pivots 54 and 55 are about 1½ inches apart, the pivots 52 and 53 are about 1 inch apart, and the top link 56 is roughly horizontal (or with its front end slightly elevated) when in the "up" position.

Figure 4B:
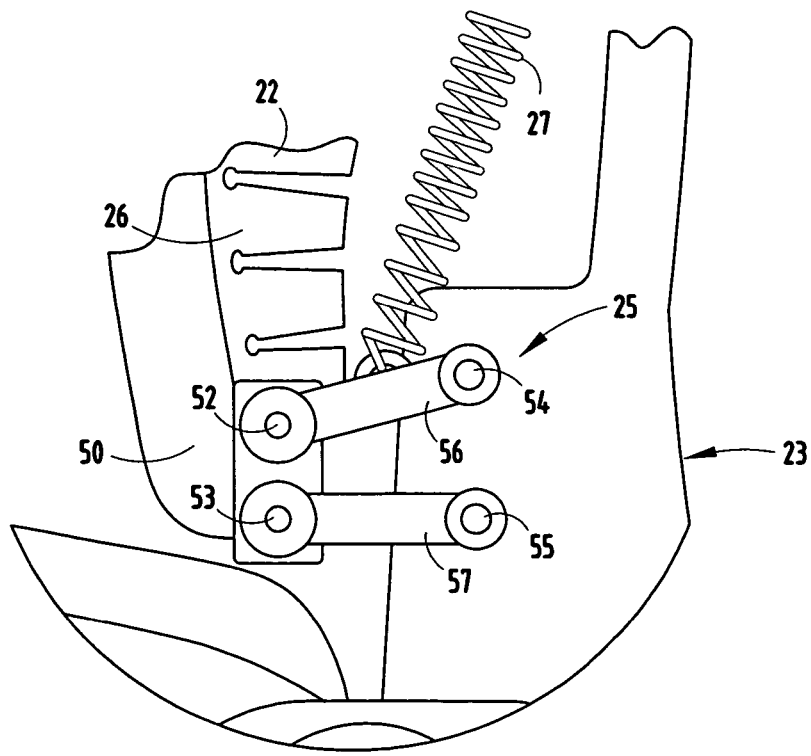
FIG. 4 is a side view similar to FIG. 3, but with the back flexed to a more planar condition.

In operation in the illustrated arrangement of FIG. 3A, when the back shell 22 is in a forwardly-protruding position (also called the "up" position) where the lumbar has a forwardly-protruding concave shape, the pelvic section 50 is in a forwardly angled position and the thoracic section 46 is in a rearwardly angled position. The biasing device 27 (FIG. 3) is attached between the back shell 22 and the back frame 23 with one end being anchored to the pelvic section 50 of the back shell 22 and the other end being anchored at a top anchor point 24 on the back frame 23, such as about halfway up or higher. Due to the upward biasing force generated on the pelvic section 50 by the biasing device 27 (i.e. an extensible coil spring), the links 56 and 57 hold the pelvic section 50 in the forwardly angled "up" position, causing the lumbar section 26 to be concavely shaped and to protrude forwardly. Notably, the links 56 and 57 can include protrusions that abut when in the up position to prevent over-travel if desired (or alternatively, another type stop can be provided, such as at any of the pivots). When the lumbar section 26 of the back shell 22 is flexed toward a more planar condition (i.e. the "down" position) (FIG. 4A), links 56 and 57 cause the pelvic section 50 to move through a specific arcuate path downwardly while being angularly rotated toward a more vertically-oriented position. At the same time, the thoracic section 46 is rotated in an opposite angular direction toward a more vertically-oriented position generally aligned with the pelvic section 50. Protruding stops can also be put on the links 56 and 57 to abut and limit flexure of the lumbar section 26. The links 56 and 57 cooperate with the lumbar section 26 to cause the pelvic section 50 to be angled forwardly when in the up position, and cause the pelvic section 50 to be more vertically oriented when in the down position. Due to the incompressibility of the lumbar section 26 along its edge strips 26' (FIG. 8), this arrangement biasingly causes the lumbar section 26 to protrude forwardly and to be forwardly concave when in the up position (FIG. 3). This arrangement also causes the lumbar section 26 to be more planar when in the down position (FIG. 4).

Notably, the positions of pivots 52-55 and a length of links 56 and 57 (and their degree of non-parallelism) can be varied to achieve many different paths of movement of the pelvic section 50 and of the lumbar section 26, including specific beginning points and end points of movement and including specific angular positions along the path of movement. Nonetheless, the present relative pivot positions, link positions, and link lengths are believed to be particularly advantageous since they result in a movement that is particularly conducive for comfortable flexible lumbar support to a seated user, based upon testing to date.

Variations and modifications are contemplated in the above concepts. In such variations and modifications, identical and similar characteristics, components, and features are identified by using the same numbers, but with the addition of the letters "A", "B", "C" and etc. This is done to reduce redundant discussion and not for another purpose.

Figure 5:
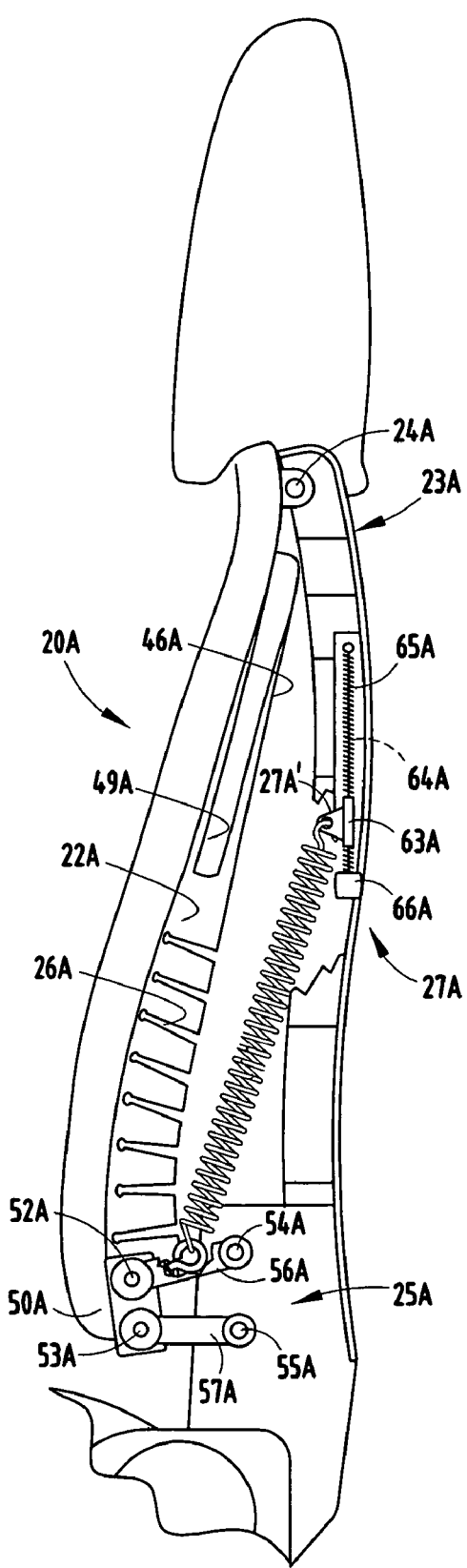
FIG. 5 is a side view of a first modified seating unit similar to FIG. 3 but including an adjustable biasing mechanism on the back shell.

The illustrated biasing device 27 (FIG. 3) is an extensible coil spring having a preset tension and spring force, and that is non-adjustable. However, it is contemplated that an adjustable biasing device 27A (FIG. 5) can be incorporated into a seating unit. For example, seating unit 20A includes a biasing device 27A having an adjustable anchor point 24A defined by a follower 63A that slidably engages a track 64A on the back frame 23A. A threaded rod 65A is threadably engaged with mating threads on the follower 63A, and a reversible DC electric motor 66A is connected to one end of the threaded rod 65A. A switch (mounted in a convenient location, such as on the side of the seat) is connected to the reversible DC motor 66A so that the motor 66A can be run to selectively rotate the rod 65A to move the follower selectively up or down along the track 64A. This in turn causes the anchor point 24A to change, increasing (or decreasing) tension on the biasing device 27A.

The seating unit 20B (FIG. 9) includes a similar biasing device 27B and sliding anchor point 24B. In the seating unit 20B, a cable 70B is attached to the follower 63B instead of a threaded rod (65A). The opposite end of the cable 70B is attached to an over-center cam 71B. A cable sleeve 72B for supporting telescoping movement of the cable 70B is anchored to the back frame 23B at location 73B and is anchored to the seat 31B at location 74B. A handle 75B extends from the over-center cam 71B and is adapted to move the cam 71B between a first adjusted position (shown in FIG. 9) for providing a first (low) level of biasing force in the biasing device 27B, and is movable to a second adjusted position (see arrow near handle 75B) to stretch the biasing device 27B for providing a second (higher) level of biasing force in the biasing device 27B. Notably, the back frame 23B includes a forwardly oriented leg 76B fixed to the upright portion 77B of the back frame 23B. The seat 31B includes a rigid forwardly-extending frame or leg 78B (and a cushion thereon if desired). A hook 79B extends below a front edge of the leg 78B. For example, the hook 79B can be used to releasably hook-attach to a front of a bench seat, such as is often found in stadium seating. The forward leg 76B of the seat 31B is pivoted to the leg 78B of the back frame 23B at pivot 80B. A protrusion 81B can be extended below the back frame 23B, permitting the seating unit 20B to be folded for compact storage or shipping, including to facilitate carrying the seating unit. When the seating unit 20B is used to attach to a bench in a stadium seat, the protrusion 81B can engage a rear side of the stadium bench to retain the hook 79B in place on the front of the bench. Alternatively, when a receptacle tube is positioned in a rearward area of a bench or stadium seat, the protrusion 81B can be fit vertically into the receptacle tube for holding the seating unit 20B in a stable position on the bench or other seating application (such as a wheelchair) without the need for a hook 79B. It is intended that the seat 31B can be replaced with or incorporated into a base 30B, and hence the identification number 30B is added to FIG. 9.

A seating unit 20C (FIG. 10) is similar to the seating unit 20B, but includes a modified arrangement for supporting the pelvic section 50C of the back shell 22C. Specifically, the links (56 and 57) are eliminated and replaced with a bracket 84C with arcuate slot 85C that is attached to the back frame 23C, and a follower 86C attached to the back shell 22C for following the arcuate slot 85C. The follower 86C includes a pair of bearings 87C and 88C that follow the arcuate slot 85C as the lumbar section 26C is flexed. The follower 86C is fixedly attached to the pelvic section 50C. As the two bearings 87C and 88C move along the arcuate slot 85C, they change their angular orientation, forcing the follower 86C and the pelvic section 50C to angularly rotate. The result in the illustrated arrangement is that the pelvic section 50C rotates along a path similar to the path followed when links 56 and 57 were used, and that the pelvic section 50C takes on a specific constrained angular orientation at each point along the path, with the angular orientation setting a flexure of the lumbar section 26C. Thus, the lumbar section 26C is flexed similarly to the flexure caused by the links 56 and 57 discussed above. The downwardly extending protrusion 81C can also be supplied and used for connection into a receptacle, as discussed above in regard to seating unit 20B. As with seating unit 20C, the seat 31C can be replaced with or incorporated into a base 30C, and hence the identification number 30C is added to FIG. 10. Notably, it is contemplated that two separate slots (85C) could be used for individual tracking by two separate bearing followers 86C, if desired. This would allow any desired angle of the pelvic section 50C to be achieved at any location along the slots (85C).

The seating unit 20C (FIG. 10) also has an adjustable biasing device 27C and sliding anchor point 61C. The illustrated adjustable biasing device 27C is pneumatic and includes an air cylinder 90C and an internal piston 91C connected to an extendable rod 92C. For example, in trucks, a compressed air supply 93C is available. By connecting the air supply 93C to the cylinder 90C via a control valve 94C selectively operated by a control switch 95C, air flow to the biasing device 27C can be controlled. Thus, by controlling air volume within the cylinder 90C, the air acts as a variable spring based on the resistance of the trapped air to compression.

In one variation, the air within the cylinder 90C could be arranged and connected so that an operator could supply air to drive the piston 91C and rod 92C all the way to one end or the other end of the cylinder 90C. This would result in holding the follower 86C at one of the selected end position(s). In such case, the biasing device 27C would set a shape of the lumbar section 26C rather than provide different levels of spring biasing force. In yet another alternative, if hydraulics were used instead of pneumatics, the device 27C would become an infinitely adjustable device for setting a desired shape of the lumbar section 26C.

The seating unit 20D (FIG. 11), often referred to as an office or task chair, includes a base 30D comprising a vertically extendable adjustable center post 93D, radially-extending legs 94D with castors 95D, and an underseat control 96D supported atop the center post 93D. A back upright 97D extends from the control 96D to support the back frame 23D. The back upright 97D is operably supported by the control 96D (as is known in the art) for movement between an upright position and a recline position, and the control 96D includes a spring biasing the back 21D toward the upright position. The back 23D is reclinable, and the seat 31D and back 23D are supported for synchronous motion upon recline of the back 21D. The illustrated back shell 22D is supported at its bottom by links 56D and 57D (see the description of links 56 and 57 above), but it is noted that any of the aforementioned arrangements could be used in seating unit 20D. Armrests 39D are shown, including an L-shaped fixed support extending outwardly from the base 30D and then upwardly beside the seat 31D. The illustrated armrests 39D are fixed. However, it is contemplated that armrests 39D could be functional and/or adjustable (vertically, angularly, fore-aft, or otherwise), and that they could be movable to a storage position permitting sliding side access into the seating unit 20D.

The seating unit 20E (FIG. 12) is a wheelchair, and includes a base frame 30E supported on large rear wheels 100E and small steerable front wheels 110E. The back frame 23E is supported on the base frame 30E at location 102E. Location 102E includes vertically oriented tube receivers that telescopingly receive protrusions 81E. It is contemplated that a laterally-extending spring-biased protrusion or latch can be used to engage a side hole in the tube receivers to securely retain the back 21E thereon. Alternatively, the back 21E can be permanently attached. The illustrated wheelchair unit 20E includes armrests 39E pivoted to laterally extending rods on the back frame 23E. The illustrated armrests 39E are relatively well-padded, but are configured to move out of the way when in an upright storage position, thus complementing the bottom connections 25E in permitting side access into the wheelchair unit 20E.

A seating unit 20F (FIG. 13) is not unlike the seating unit 20B (FIG. 9), but includes a modified biasing device 27F and a cushioned seat 31F. Specifically, the biasing device 27F is a torsion spring located at pivot 54F (or at any of the pivots 52F-53F, 55F, 47F). A hook 79F extends downwardly from a front of the seat 31F. The back frame 23F includes a forward leg 76F pivoted to the seat 31F at location 80F, so that the back 21F can be conveniently folded onto the seat 31F for storage and/or transport. Also, it is noted that the pivots defined by top connection 47F are located below a top edge of the back shell 22F, and that the back shell 22F extends above a top of the back frame 23F, thus providing a slightly different appearance and back flex motion. The illustrated back frame 23F is tubular and defines an inverted rectangular arch shape.

It is to be understood that variations and modifications can be made on the aforementioned structure without departing from the concepts of the present invention, and further it is to be understood that such concepts are intended to be covered by the following claims unless these claims by their language expressly state otherwise.

We claim:
1. A back construction for a seating unit, comprising:
a back frame; and a back support including top and bottom connections operably supporting the back support on the back frame, the back support having a flexible lumbar region between the top and bottom connections, the bottom connection directing movement of a lower edge of the back support along a predetermined path as the lumbar region is flexed from a forwardly-protruding shape toward a more planar shape while providing continuous lumbar support to a seated user during changes between the shapes, the bottom connection being positioned rearward of and configured to not project in front of a front surface of sides of the lower edge of the back support, wherein the bottom connection comprises a linkage including at least one pair of links each with a first end pivoted to the back frame and with a second end pivoted to the back support.

2. The back construction defined in claim 1, wherein the bottom connection is located rearward of the front surface of the sides of the lower edge in a location that reduces interference to a user sliding laterally onto the back support.

3. The back construction defined in claim 1, wherein the linkage defines a four bar linkage arrangement with the back support and the back frame, the four bar linkage arrangement not forming a parallelogram.

4. The back construction defined in claim 1, wherein the at least one pair of cooperating links includes a pair of links on each side of the back support.

5. The back construction defined in claim 4, wherein each of the at least one pair of links are non-parallel and define an angle therebetween.

6. The back construction defined in claim 4, wherein the at least one pair of links are similar in length.

7. The back construction defined in claim 4, wherein the back support also includes a biasing device that biases the back support causing the lumbar region to flex toward the forwardly-protruding shape.

8. The back construction defined in claim 1, wherein the back frame includes downwardly extending lower legs adapted to telescopingly engage mating structure on a base for supporting the back construction.

9. A wheelchair comprising a mobile base and a seat, and also including the back construction as defined in claim 1, the back construction being operably mounted on the mobile base for active lumbar supporting motion relative to the seat.

10. The back construction defined in claim 1, wherein the back support has relatively rigid thoracic and pelvic regions located above and below the lumbar region, respectively, and wherein the lumbar region comprises a forwardly-protruding region connecting the thoracic and pelvic regions.

11. The back construction defined in claim 1, including a biasing device that biases the back support in a manner causing the lumbar region to flex toward the forwardly-protruding shape.

12. The back construction defined in claim 11, wherein the biasing device comprises a separate member.

13. The back construction defined in claim 11, wherein the biasing device is continually active and continuously biasing the lumbar region toward the forwardly-protruding shape.

14. The back construction defined in claim 11, wherein the biasing device is adjustable to provide an adjustable biasing force.

15. The back construction defined in claim 11, wherein the biasing device is operably attached between the back frame and the lower edge of the back support.

16. The back construction defined in claim 15, including an adjuster for adjusting a biasing force of the biasing device.

17. The back construction defined in claim 16, wherein the adjuster includes a guide on the back frame and includes a follower that slidably engages the guide, the biasing device being operably attached to the follower.

18. The back construction defined in claim 16, wherein the adjuster includes a powered mechanism for adjusting the biasing device.

19. The back construction defined in claim 11, wherein the biasing device comprises an extensible spring.

20. The back construction defined in claim 11, wherein the biasing device includes a pneumatic device.

21. The back construction defined in claim 1, wherein the back frame includes at least one forwardly-extending leg with a hook-shaped attachment section adapted to engage a support structure.

22. The back construction defined in claim 1, wherein the back frame includes forwardly extending lower legs having at least one pivot thereon, the legs being adapted for mounting to a mobile pedestal chair base.

23. A seating unit comprising a base and a seat, and also including the back construction defined in claim 1, the back construction being operably mounted on the base for reclining motion relative to the seat.

24. The seating unit defined in claim 23, wherein the base includes radially-extending castored legs for mobile rolling on a floor surface.

25. The seating unit defined in claim 23, wherein the base includes flanges for attachment to a vehicle body.

26. The seating unit defined in claim 25, wherein the seating unit comprises a vehicle seat with the back construction, the seat, and the back frame having suitable strength and construction for passing federal motor vehicle safety standards, including impact and crashworthiness test requirements.

27. A back construction for a seating unit comprising:
a back frame;
a back support; and
at least two connections operably connecting the back support to the back frame for movement relative to the back frame; the at least two connections including a pair of spaced-apart cooperating links on each side, each with a first end connected to a lower portion of the back frame and each with a second end connected to a lower portion of the back support, the cooperating links being positioned and adapted to constrain a body-supporting portion of the back support to move along a predetermined path that provides continuous lumbar support to a seated user and, while moving along said path the body-supporting portion, defining a predetermined vertical angle corresponding to each location along the predetermined path;
wherein the first and second ends of each of the first and second links define four axes of rotation, the four axes defining a first pattern that is different than a second pattern where the second pattern defines a parallelogram linkage arrangement.

28. A back construction for a seating unit comprising:
a back frame;
a back support; and
at least two connections operably connecting the back support to the back frame for movement relative to the back frame; the at least one connection including a pair of spaced-apart cooperating links each with a first end pivotally connected to the back frame and each with a second end pivotally connected to the back support, the cooperating links having different lengths and being positioned and adapted to constrain a body-supporting portion of the back support to move along a predetermined path that provides continuous lumbar support to a seated user and, while moving along said path the body-supporting portion, defining a predetermined vertical angle corresponding to each location along the predetermined path.

29. A seating unit comprising:
a base;
a seat;
a back frame; and
a back support including at least one top connection operably supporting the back support on the back frame and at least one bottom connection operably supporting the back support on one of the base and the back frame, the back support having a flexible lumbar region between the top and bottom connections, the bottom connection being constructed to direct movement of a lower edge of the back support generally downwardly along a predetermined path as the lumbar region is flexed from a forwardly-protruding shape toward a more planar shape while providing continuous lumbar support to a seated user during changes between the shapes, the bottom connection being positioned rearward of front surfaces along sides of the lower edge, wherein the at least one bottom connection includes a pair of links on each side forming at least one four-bar linkage arrangement.

30. The seating unit defined in claim 29, wherein the base includes a pair of large rear wheels and angularly adjustable front wheels forming a wheelchair.

31. The seating unit defined in claim 29, wherein the base includes attachment flanges configured for attachment to a vehicle body, and wherein the base, seat, and back frame have suitable strength and construction for passing federal motor vehicle safety standards, including impact and crashworthiness test requirements.

32. The seating unit defined in claim 29, wherein the base includes radially extending legs and castors on the legs for rolling support on a floor surface.

33. A back construction for a seating unit, comprising:
a back frame; and
a back support including at least one top connection and at least one bottom connection operably supporting the back support on the back frame, the back support having a flexible lumbar region between the at least one top and bottom connections, at least one of the connections constraining movement of the back support along a predetermined path as the lumbar region is flexed from a forwardly-protruding shape toward a more planar shape while providing continuous lumbar support to a seated user during changes between the shapes, the one connection being positioned rearward of and configured to not project in front of a front surface of sides of the back support, wherein the at least one bottom connection includes a four-bar linkage with four defined axes.

34. The back construction defined in claim 33, wherein the four-bar linkage includes a pair of links on each side of the back support.

35. The back construction defined in claim 33, including a bottom leg configured for attachment to a vehicle body, and wherein the back frame has a suitable strength and construction for passing federal motor vehicle safety standards, including impact and crashworthiness test requirements.

36. The back construction defined in claim 33, wherein the back frame includes a rearwardly extending leg having a pivot thereon and is adapted for use in an office chair.

37. The back construction defined in claim 28, wherein the at least two connections are positioned entirely behind a front surface of the back support.

38. The back construction defined in claim 28, wherein at least some of the predetermined angles at each location are different than adjacent ones of the predetermined vertical angles.

39. The back construction defined in claim 28, wherein the predetermined path is non-linear.

40. The back construction defined in claim 28, wherein the cooperating links are elongated to define longitudinal axes that extend in non-parallel directions.

41. The back construction defined in claim 28, wherein the at least two connections include a second pair of cooperating links, the second pair of cooperating links being positioned on a side of the back support opposite the first-mentioned pair of cooperating links.

42. A seating unit comprising:
seat;
a back frame;
a back support operably connected to the back frame at an upper connection and a lower connection, the back support having a flexible lumbar region generally between the upper and lower connections; and
the lower connection including a linkage arrangement having at least a pair of cooperating links near each side, each link pivoted to the back frame at one end and pivoted to the back support at another end so as to be adapted to constrain at least the lower portion of the back support to move along a predetermined path that provides continuous lumbar support to a seated user as the lumbar region is moved.

43. The seating unit defined in claim 42, wherein the cooperating links on each side form a four-bar linkage.

44. The seating unit defined in claim 43, wherein the cooperating links on each side of the back support include vertically aligned top and bottom links.

45. The seating unit defined in claim 42, wherein the lumbar region is flexible.

46. The seating unit defined in claim 42, including a base having a pair of large rear wheels and angularly adjustable front wheels forming a wheelchair.

47. The seating unit defined in claim 42, including a base having attachment flanges configured for attachment to a vehicle body, and wherein the base, seat, and back frame have suitable strength and construction for passing federal motor vehicle safety standards, including impact and crashworthiness test requirements.

48. The seating unit defined in claim 42, including a base having radially extending legs and castors on the legs for rolling support on a floor surface.

49. The seating unit defined in claim 42, wherein the linkage arrangement extends rearward of the back support.

50. A seating unit comprising:
a seat;
a back frame;
a back support connected to the back frame at an upper connection and a lower connection, the back support having a lumbar region generally located between the upper and lower connections; and
the lower connection including a constraining mechanism located rearward of the forward face of the back support and adapted to constrain at least the lower portion of the back support to move and rotate along a predetermined path that provides continuous lumbar support to a seated user as the lumbar region is moved, wherein the lower connection includes a four-bar linkage with four defined axes of rotation.

51. The seating unit defined in claim 50, wherein the lumbar region is flexible.

52. The seating unit defined in claim 50, wherein the four-bar linkage includes a pair of links on each side of the back support.

53. The seating unit defined in claim 50, including a base having radially extending legs and castors on the legs for rolling support on a floor surface.

54. The seating unit defined in claim 50, including a base having a pair of large rear wheels and angularly adjustable front wheels forming a wheelchair.

55. The seating unit defined in claim 50, including a base having attachment flanges configured for attachment to a vehicle body, and wherein the base, seat, and back frame have suitable strength and construction for passing federal motor vehicle safety standards, including impact and crashworthiness test requirements.

56. A back construction for a seating unit comprising:
a back frame;
a back support; and
at least one connection operably connecting the back support to the back frame for movement relative to the back frame; the at least one connection including a pair of spaced-apart cooperating links each with a first end pivotally connected to the back frame and each with a second end pivotally connected to the back support, the cooperating links being positioned and adapted to constrain a body-supporting portion of the back support to move along a predetermined path that provides continuous lumbar support to a seated user and, while moving along said path the body-supporting portion, defining a predetermined vertical angle corresponding to each location along the predetermined path, wherein the back support comprises a shell having a flexible lumbar region.

* * * * *